Dec. 30, 1941.  A. L. HONSTETTER ET AL  2,268,119
CHECK VALVE FOR CONTROLLING PRESSURE
Filed Feb. 24, 1940
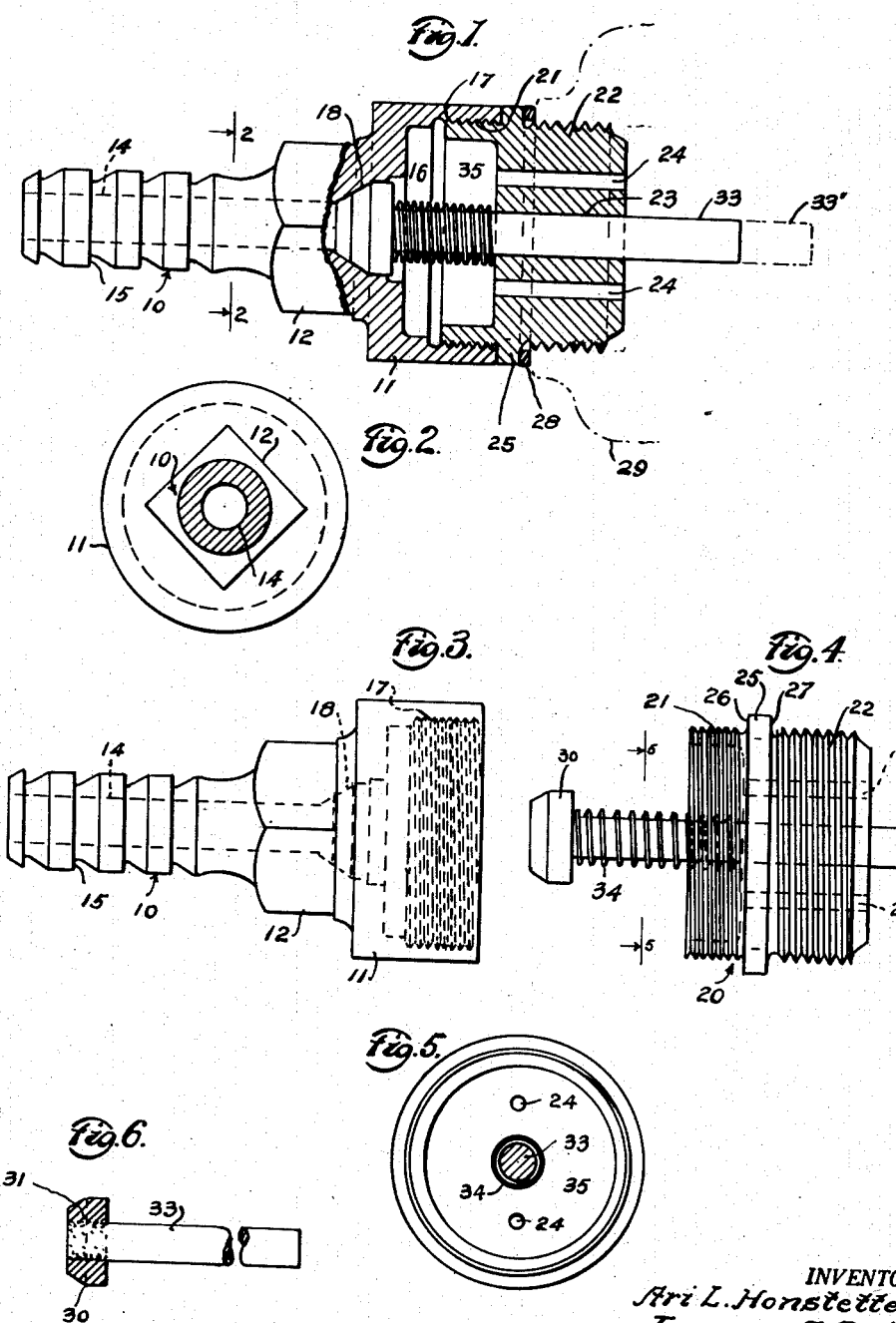
INVENTORS,
Ari L. Honstetter,
James A. Cole.
By Harold D. Penney.

Patented Dec. 30, 1941

2,268,119

UNITED STATES PATENT OFFICE 2,268,119

CHECK VALVE FOR CONTROLLING PRESSURE

Ari L. Honstetter and James A. Cole, New York, N. Y.

Application February 24, 1940, Serial No. 320,622

3 Claims. (Cl. 251—144)

This invention relates to check valves and more particularly to check valves for controlling pressure fluid introduced into beer kegs or the like for forcing the beverage up from the keg and out through a dispensing tap or faucet.

One object of the invention is to provide an improved valve of this kind which is so constructed that it is easy to lap or polish the valve member and its seat while the parts are assembled, and to accomplish this operation easily by hand.

Other objects of the invention are to provide an improved valve of this kind which may be easily attached to the bung or entrance bushing or spud of a keg or the like, and with which this attachment may be easily effected in a fluid-tight manner.

Another object is to provide an economically manufactured valve member with associated valve stem.

Additional objects of the invention are to effect simplicity and efficiency in such valves and to provide an extremely simple valve of this kind which is easily cleaned and lapped and is economical, durable, and reliable in operation, and economical to manufacture and easy to install.

Still other objects of the invention will appear as the description proceeds; and while details of the invention are described in the specification many and various changes may be made without departing from the scope of the invention as claimed.

The inventive features for the accomplishment of these and other objects are shown herein in connection with an improved check valve which briefly stated, includes a valve-seat body member having an inlet nozzle at one end and a valve-receiving chamber at the other end, the chamber having a valve seat at the inner end of the chamber, and a guide plug secured in the chamber and having an air-passage therethrough and a stem guide bore slidably receiving the stem of a valve member yieldably seated on the seat. Said stem and valve are secured fast together and are freely rotatable, the stem projecting from the plug a sufficient distance to be conveniently rotated between the thumb and finger for lapping the valve and seat after lapping material has been applied and the valve is yieldably seated.

In the accompanying drawing showing, by way of example, one of many possible embodiments of the invention:

Fig. 1 is a fragmental longitudinal vertical sectional view, partly in elevation, showing the check valve applied to the entrance spud of a keg or the like;

Fig. 2 is a section taken on the line 2—2 of Fig. 1;

Fig. 3 is a side elevation of the check valve body member;

Fig. 4 is a side elevation of the plug, valve member and spring detached from the body member;

Fig. 5 is a sectional view taken substantially on the line 5—5 of Fig. 4, looking in the direction of the arrows of said line, and showing the inner end of the plug in elevation; and Fig. 6 is a longitudinal vertical sectional view, showing the valve stem in elevation, and showing the stem secured to the valve disk with a molded or forced fit.

The check valve comprises a valve-seat body member 10, 11 having a hose-receiving nozzle 10 at one end, a cylindrical valve-receiving bushing 11 at the other end, and an intermediate angular wrench receiving portion 12 between the nozzle and bushing, said nozzle, bushing and portion being of brass or other suitable metal or material and preferably, but not necessarily, all integral and coaxial. Said nozzle has an axial bore 14 therethrough and has annular hose-receiving and locking ribs 15 therearound adapted to receive a hose connected with a pressure supply pump, storage cylinder or other source of air or gas under pressure.

The bushing 11 has therein a cylindrical valve chamber 16 having an open outer end having interior slow threads 17 of slight pitch, said bushing having at the inner end a conical valve seat 18 coaxial with and joining the inner end of said bore 14. Said chamber receives the inner end of a guide plug 20 having exteriorly threaded ends 21, 22, an axial valve-stem guide bore 23 and one or more parallel air-passage bores 24, all passing through the plug.

The plug is provided with an annular rib 25 around its midpart providing inner and outer shoulders or faces 26 and 27; and when the inner threaded end 21 is engaged with the threads 17 of the outer end of the chamber, the inner shoulder 26 may engage the end face of the bushing 11 with a fluid-tight fit made more effective by the slow pitch of the threads. The outer shoulder 27 is adapted to receive a gasket or washer 28, whereby when the outer end 22 is threadedly engaged in, for instance, an entrance bushing or spud 29 in a container, keg or the like, the gasket or washer will form a fluid-tight seal for the connection between the shoulder 27 and the end face of the spud 29.

A conical valve member or disk 30 of synthetic resin, plastic or other material yieldably seated on the seat 18 is provided with a central aperture 31 (Fig. 6) in which is received the roughened end of a valve stem 33 secured fast in said aperture by a forced or molded fit or in other suitable manner, and slidable in said guide bore 23 and projecting through the plug, for a purpose to be explained. By making the stem 33 and disk 30 of separate pieces, economy of material is effected.

A helical compression spring 34 on said stem compressed between the plug and valve member holds the member yieldably on its seat, the plug being hollowed out to form a large recess 35 at the inner face to accommodate a sufficient length of spring without increasing unnecessarily the size of the chamber 16. When air or other gas under pressure is supplied through the hose and the bore 14, the valve is lifted from the seat and the gas under pressure passes through the passage bores into the keg or other container, thereby raising the pressure in the keg sufficiently to force the liquid therein upwardly and out at a tap connected thereto, when the tap is opened. When this takes place, the stem 33 may move to the position of the dotted line 33' Fig. 1. Said spring 33 normally yieldably holds the valve member on its seat to prevent back-flow of gas fumes, beer or other liquid when the pump is not working or when the pump, cylinder or other pressure supply is removed, or if for any other reason the pressure is low, thereby to prevent the hose, pump or other pressure means from becoming contaminated.

The stem 33 normally projects exteriorly from the plug a sufficient distance to be conveniently rotated between the thumb and finger, whereby when the valve assembly is removed, as by means of a wrench on the portion 12 from the keg or other container, and a polishing or seat-lapping mixture is applied to the valve seat 18 and the conical face of the valve member 30, the seat and face may be ground or lapped to remove any formation, deposit or irregularity that may be caused by the fumes or contact of beer or the like on the valve seat and member.

The invention claimed is:

1. In a check-valve air inlet for beer kegs, a valve-seat body member comprising an inlet and a valve-receiving chamber having a valve seat communicating with the inlet; a guide plug secured in the chamber and having an axial valve-stem guide bore, and long slender air-passage bores passing through the plug; the inner end of the plug adjacent to the seat having a large deep recess nearly as large in diameter as the plug and about half as long as said chamber; a valve member engageable with the seat having a stem slidably in said guide bore; and a spring on said stem in said chamber and recess and compressed between the plug and valve member; said long slender air passages, serving, when the assembly is upright and in use to check the rise of foam to the chamber; said chamber and recess serving the double function of providing a reservoir for rising liquid to prevent its reaching the valve, and to provide space for the spring, and shorten the bushing body.

2. In a check-valve air inlet for beer kegs, a valve-seat body member comprising an inlet and a valve-receiving chamber having interior threads and having a valve seat communicating with the inlet; a guide plug having an axial valve-stem guide bore and long slender parallel air-passage bores, all passing through the plug; the inner end of the plug having a large deep circular recess coaxial with the plug and nearly as large in diameter as the plug and more than half as long as said chamber and forming a skirt having threads throughout engaged with the threads of the chamber; a valve member yieldably seated on the seat having a stem slidably in said guide bore; and a spring in said chamber and recess and compressed between the plug and valve member.

3. A check valve assembly comprising in combination, a valve-seat having therein a cylindrical valve chamber having at the inner end a valve seat, said chamber having interior threads of slow pitch extending from the outer end of the chamber to near the inner end; a guide plug having an exteriorly threaded inner end, an axial valve-stem guide bore and long slender parallel passage air-passage bores, all passing through the plug; an annular rib around the plug flush with the cylindrical face of the bushing; the inner end of the plug having a large deep circular recess coaxial with the plug and nearly as large in diameter as the plug and extending nearly to said rib and forming a skirt having threads engaged with the threads of the chamber.

ARI L. HONSTETTER.
JAMES A. COLE.